Sept. 19, 1967 N. H. LOVENDAHL 3,341,919
TOOL HOLDER ARRANGEMENT
Filed Aug. 1, 1963 2 Sheets-Sheet 1

INVENTOR.
N. H. LOVENDAHL
BY Phillip A. Weiss
ATTORNEY

INVENTOR.
N. H. LOVENDAHL
BY
ATTORNEY

United States Patent Office 3,341,919
Patented Sept. 19, 1967

3,341,919
TOOL HOLDER ARRANGEMENT
Norman Herbert Lovendahl, Elmwood Park, Ill., assignor to Futurmill, Inc., Farmington, Mich., a corporation of Michigan
Filed Aug. 1, 1963, Ser. No. 299,331
23 Claims. (Cl. 29—96)

This invention relates generally to tool holders for use with machine tools and more particularly concerns a novel tool holder arrangement incorporating clamping means for holding cutting inserts in such tool holders.

In the early days of the machine tool industry cutting inserts were not employed; instead an entire shank was made up of a tool cutting material. This was of course expensive, not only because of the high cost of the tool but also because of the brittleness of the tool and the necessity of using different shanks for different jobs.

To overcome these difficulties, the use of a separate tool bit or insert on a shank was soon instituted. One of the original ways used to attach the insert to the holder was by welding. This method also had obvious disadvantages. For example as the cost of skilled labor increased the welding operation became increasingly less economical. In addition, welding the cutting insert to the tool holder provided a permanent attachment and consequently failed to realize the versatility which might be obtainable when using a separate cutting insert with a tool holding clamp.

To provide the desired versatility, screw clamp arrangements were utilized to secure the cutting insert to the tool holder. The clamping arrangements proved to be a notable improvement over the previous tools and tool holding arrangements practiced by the machine tool industry. None-the-less, it too failed to provide an ideal tool and tool holder arrangement. Difficulties were encountered. For example, it was soon found that the clamp interfered with the chip flow with consequent nocuous effects on the finished machined product. In addition it was found that chips and particularly the cutting fluid on the chips tend to corrode the clamp screw making it almost impossible to readily remove the cutting insert.

The removal of interferences with the chip flow was affected by discarding the clamping arrangement and using instead a clamp screw arrangement whereby the cutting insert is countersunk to receive a flat head clamp screw so that nothing interferes with the chip flow. Difficulties have been encountered with this arrangement. For example, it was discovered that the corrosion problem wherein the chips corrode the clamp screw was still encountered. In addition, with the simple clamp screw arrangement the screw must be removed entirely whenever the cutting insert is removed.

Another well known cutting insert securing arrangement presently in use comprises an eccentric cam lock. With this arrangement, the problem of the locking device interferring with the chip flow is avoided as is the corrosion problem. However, other problems are encountered when using the cam-lock arrangement. For example, this arrangement inherently only makes use of one locating surface when the cutting insert is fastened to abut against the tool holder. In addition the location and the size of the aperture in the cutting insert is critical. Also the cut-away in the tool holder weakens the tool holder.

In addition to the tool holders mentioned, complicated combinations of the tool holders described have been tried. None of these known tool holders provides a means of overcoming all of the difficulties mentioned.

Accordingly, it is the principal object of this invention to provide an inexpensive simple tool holder that avoids the difficulties regularly encountered by known tool holders.

It is a more specific object of this invention to provide a tool holder that utilizes a screw clamp arrangement whereby nothing interferes with the chip flow.

A related object of the invention is to provide a tool holder wherein the clamp screw is not adversely affected by the corrosive nature of the machine chips.

A further object of the invention is to provide a tool holder arrangement wherein the cutting insert can be easily removed and replaced. This characteristic advantage of the inventive arrangement is accomplished since it is not necessary to remove the clamp screw to remove the cutting insert. It is only necessary to loosen the clamp screw and the cutting insert can easily be removed. None-the-less, when the clamp screw is tightened, the cutting insert is positively located and rigidly clamped.

Still another object is to provide a tool holder arrangement wherein that portion of the tool holder that is under the cutting point of the insert is not weakened by any apertures or recesses required to retain the clamping screw.

Yet another object of the invention is to provide a tool holder arrangement wherein a novel and unique clamp screw simultaneously exerts horizontal and vertical forces on the cutting insert, clamping it against the bottom of the horizontal truncated surface and the surface or furcated surfaces in planes perpendicular to the noted horizontal surface. Thus the cutting inserts are both positioned and clamped against at least two surfaces allowing true location and more secure clamping.

In accordance with one aspect of the invention a tool holder arrangement is provided wherein a tool shank is truncated at one end to provide a bed or a level horizontal locating surface having furcated vertical locating or abuttment surfaces contiguous thereto. A threaded aperture extends at an angle from the top of the horizontal surface to the bottom of the tool holder beneath the horizontal surface. The angle is such that the hole is closer to the truncated end of the shank at the top of the horizontal surface than it is at the bottom of the tool holder. A special clamping screw threads into the aperture. The screw is cylindrical for approximately one-half its length. At that point it is machined so that it comprises a truncated cone with its smallest diameter at approximately the midpoint of the screw. The cone assumes the diameter of the original cylindrical screw at its end and is threaded so that it can readily pass through the aperture. The screw is interjected into the aperture until only the conical section is above the horizontal surface. The cutting insert is slipped over the truncated cone and abuts the horizontal surface. As the screw is threaded deeper into the aperture the conical portion of the screw is forced against the insert and thus clamps the insert into position abutting both the horizontal surface and the furcated vertical surfaces. Thus a well located and firmly secured cutting tool is obtained.

The foregoing and other objects and advantages of this invention and the manner of obtaining them will become more apparent and the invention itself will be best understood by reference to the following description of embodiments of the invention taken in conjunction with the accompanying drawings, wherein.

In the drawings and in the description that follows, the same numerical designations are used to identify the same parts shown in different views.

Figure 1:
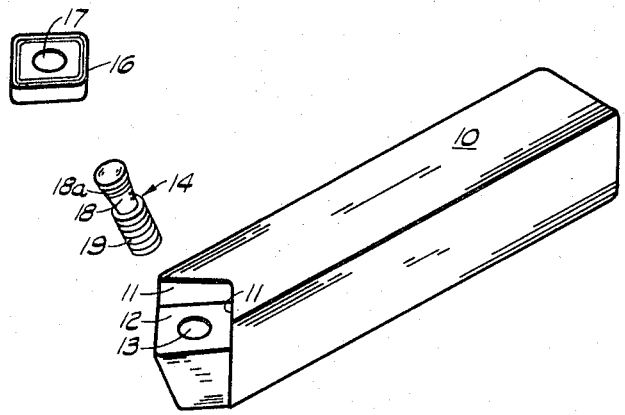
FIG. 1 is an exploded pictorial representation of the tool holder arrangement of the invention.

FIG. 1 shows an embodiment of the inventive tool holder arrangement in exploded pictorial form. A front portion of a shank or tool holder 10 is shown having one end thereof machined to provide several locating surfaces. Vertical locating surfaces 11 are comprised of a furcated section perpendicular to the horizontal locating surface or bed 12. The vertical locating surface could be comprised of a non-furcated single vertical locating surface.

The horizontal locating surface 12 has a threaded aperture 13 which extends at an angle through the tool holder.

The aperture 13 is designed to receive a clamp screw 14. A bit or cutting insert 16, having an aperture 17 sets over the noted clamp screw and is clamped firmly against both locating surfaces when the clamp screw is threaded into aperture 13. It should be noted that the location of aperture 17 in insert 16 is not critical. On the other hand when other means such as cams are used to hold the cutting bit, the location of the hole in the cutting insert is critical because if the aperture is misplaced, the insert will not fit over the cam and still abut a locating surface. In the inventive arrangement described herein, if the aperture is off center the insert still abuts the locating surface because the clamp screw merely stops at a different position in the aperture 13 when forcing the insert into juxtaposition with the locating surfaces.

FIG. 1 best shows the inventive clamp screw as a unitary structure comprising a truncated conical section 18 and a cylindrical section 19. The cylindrical section 19 is shown externally threaded throughout its length. The thread matches the thread in aperture 13. Although not shown in FIG. 1, the bottom of the clamp screw is fashioned to receive a wrench, such as an allen wrench, for use in tightening and loosening the clamp screw 14 when it is assembled into aperture 13.

The truncated conical section 18 assumes a diameter equal to the diameter of the cylindrical section at its end, 18a, furthest from the noted cylindrical section. This portion of the clamp screw is also threaded. The screw thread at this end of the clamp screw serves several useful functions. For example, the screw thread of section 18a allows the clamp screw 14 to be removed through the bottom of aperture 13. This is often important when replacing cutting inserts on the job. In addition the threads of section 18a increase the friction of clamp screw 14 against aperture 17 of cutting insert 16 thereby acting to lock the clamp screw and prevent its loosening or unscrewing responsive to vibrations present during a cutting operation.

Figure 2:
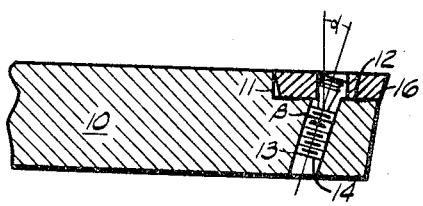
FIG. 2 is a cross sectional view of a tool holder of FIG. 1.

Referring to FIG. 2 there is illustrated a cross-sectional view of the assembled inventive tool holder arrangement. Tool holder 10 has threaded aperture 13 at the end thereof. As is best shown in FIG. 2, the central axis of aperture 13 is at a slight angle to a line normal to the horizontal locating surface 12. This angle is designated as $\alpha$.

The apex angle of the sides of the conical section 18 of clamp screw 14 to the axis of the screw is shown as the angle $\beta$. The angle is almost equal to the angle $\alpha$, so that the sides of the conical section 18 are substantially parallel to the inner peripheral wall of aperture 17 in cutting insert 16.

The inventive cutting tool arrangement is assembled by first partially screwing clamp screw 14 into aperture 13 in shank 10. The truncated conical section 18 of the clamp screw 14 is permitted to remain well above the horizontal locating section 12 so that the distance between the truncated conical section 18 and the furcated vertical section 11 is larger than the distance between the circumference of aperture 17 and the outer periphery of cutting insert 16. Thus the cutting insert can easily be slipped over the clamping screw 14. The clamping screw is then threaded deeper into aperture 13 using any appropriate tool, such as an allen wrench. As the clamping screw goes further into aperture 13 the distance between the conical section 18 and locating surface 11 is decreased because of the angle of aperture 13. As the noted distance decreases the conical section 18 asserts a force on the cutting insert. Because of the angle of aperture 13 and the shape of the clamping screw this force has horizontal and vertical components. The horizontal component of the force causes the cutting insert to abut vertical locating surfaces 11. Simultaneously, the vertical components of the force causes the cutting insert to abut against locating surface 12. Thus the inventive arrangement causes the cutting insert to position in juxtaposition with both horizontal and vertical locating surfaces.

As illustrated in FIG. 2 when the cutting insert is clamped in place there is nothing to interfere with the chips flowing from the article undergoing machining. In addition, since the aperture 13 is slanted away from the cutting edge any adverse weakening effect of the aperture on the tool holder is minimized and the portion of the tool holder immediately beneath the cutting point of the insert is hence stronger than it is in known tool holders.

A related advantage inherent in the inventive arrangement is that the size of the cutting insert is not critical because a small insert can be used without weakening the tool holder as would occur if a cam clamp was used and the aperture 13 was not at an angle.

Other advantages inure to the inventive arrangement. For example, the insert will not fall out even if the clamp screw does loosen slightly during a machining operation, since several turns of the clamp screw are required before the insert can be removed.

Figure 3:
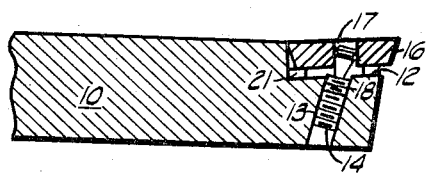
FIGS. 3 and 4 are cross sectional views of tool holder arrangements shown in FIG. 2 but having a positive and negative rake respectively.
Figure 4:
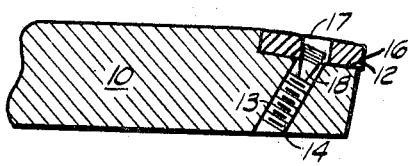

As shown in the cross sectional views of FIGS. 3 and 4, the inventive arrangement is not limited to the normal cutting angle of FIG. 2. Thus FIG. 3 shows insert 16 positioned on a tool holder 10 having a positive cutting angle. A support seat 21 may be used if desired. The angle between a perpendicular to locating surface 12 and the axis of aperture 13 is such that the sides of conical section 18 of clamp screw 14 are substantially parallel to the sides of aperture 17 at a point furthest from the cutting edge whereby the advantageous clamping action is obtained with this embodiment of the inventive arrangement as with the embodiment of FIG. 2.

Similarly, FIG. 4 illustrates a cutting insert 16 positioned on tool holder 10 having an insert pocket which positions the insert at a negative cutting angle. Here again the angle between a perpendicular to locating surface 12 and the axis of aperture 13 is such that the conical section of clamp screw 14 is substantially parallel to the sides of aperture 17 furthest from the cutting edge to give the advantageous clamping action previously described.

It should be observed that the insert is easily removed from the tool holder even when the tool holder is mounted on a machine tool.

Any erosion caused by the chip flow will have little if any effect on the ability to loosen the clamp screw because, among other things, the point of screw actuation is under the tool holder out of the chip flow path.

Figure 5:
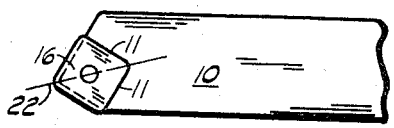
FIGS. 5–8 show some of the insert shapes that can be accommodated by the inventive arrangement.

The ease of removing inserts as well as the adaptability of the inventive arrangement to many different types of inserts makes the arrangements ideal for these different inserts, some of which are illustrated in FIGS. 5, 6, 7 and 8. FIG. 5 for example illustrates in a plan view the use of the inventive tool holder arrangement in an embodiment substantially similar to that of FIGS. 1 and 2. The tool holder 10 has two vertical locating surfaces 11 designed to receive in abutting relationship cutting insert 16. The horizontal force component exerted by the clamp screw is expended along line 22 toward the tool holder.

Figure 6:
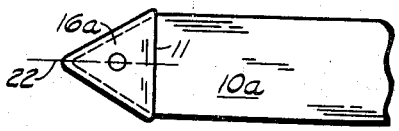

FIG. 6 shows triangular shaped cutting insert 16a on differently shaped tool holder 10a. In this embodiment there is only one vertical locating surface 11. The horizontal component of the force exerted by the clamp screw is normal to this locating surface, as is shown by line 22.

Figure 7:
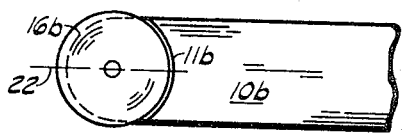

FIG. 7 shows a circular cutting insert 16b attached to tool holder 10b. The vertical arcuate locating surface 16b has a radius slightly larger than the radius of the cutting insert. The distance between the clamp screw hole and the locating surface is such that the cutting insert abuts locating surface 11b when the clamp screw is screwed deeper into the aperture, due to the horizontal force component of the clamping screw that is exerted along line 22.

Figure 8:
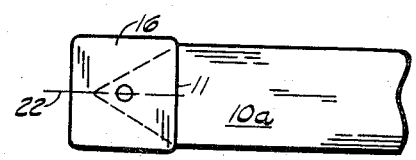

FIG. 8 shows how cutting insert 16 could be used with tool holder 10a wherein only one vertical locating surface is available. The horizontal force component on the clamp screw is exerted along line 22 normal to surface 11.

Figure 9:
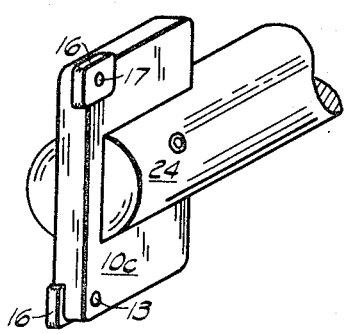
FIG. 9 shows a type of tool holder adapted for reaming or boring.

FIG. 9, wherein is shown boring bar 24 holding tool holder 10c which is capable of holding two cutting inserts designated as inserts 16 further illustrates the versatility of the inventive arrangement.

Figure 10:
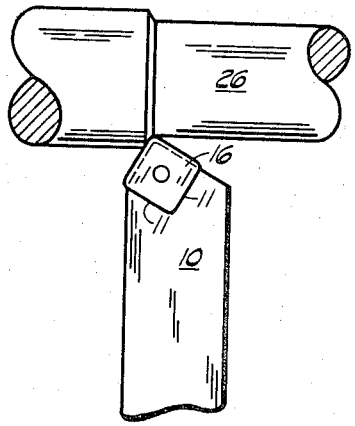
FIG. 10 shows the tool of FIG. 1 presented to a piece on a lathe.
Figure 11:
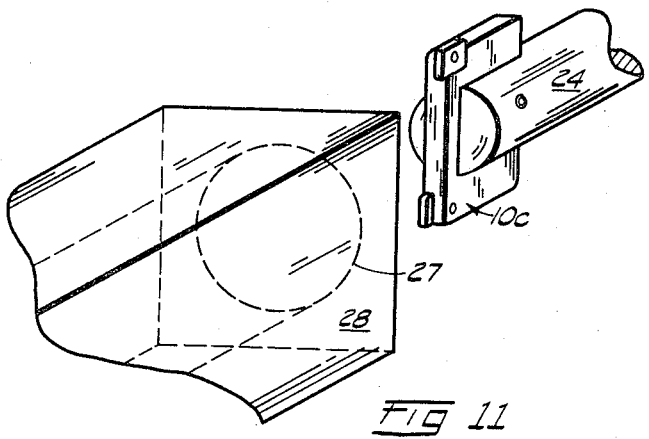
FIG. 11 shows the tool of FIG. 9 presented to a work piece on a boring machine.

FIG. 10 shows the tool holder of FIG. 1 in position on a lathe while machining shaft 26. FIG. 11 shows the boring bar of FIG. 9 in position to machine aperture 27 in work piece 28. When used on a lathe the tool of course remains stationary, while when used on a boring machine the tool revolves. The inventive arrangement works equally well in either case.

One actual embodiment of the inventive arrangement has an angle α equal to approximately 10 degrees on a one inch square tool holder. The angle β is also approximately 10 degrees. The insert size is one-half inch square and $3/16$ inch thick with a $3/16$ inch diameter hold. This arrangement allows for a variation in dimensions well beyond those normally required in the industry for such clamping arrangements. Larger angles may be used for larger inserts where greater variations may be encountered.

Summarizing, the description of this invention discloses an improved, economical and reliable tool holder arrangement wherein the cutting insert is firmly clamped against at least two locating surfaces without having any impediment in the chip flow path. In addition, the location of the aperture in the insert is not critical nor is the size of the insert critical. This relaxation of critical requirements along with the ease of replacing inserts on the tool holder, because, among the other reasons, it is not necessary to remove the clamp screw to remove the cutting insert, contribute to making the inventive arrangement extremely versatile.

While the above principles and advantages of the invention have been described in connection with specific arrangements and apparatus, it is to be clearly understood that this description is made only by way of example and not as a limitation on the scope of the invention.

What is claimed is:
1. A cutting tool holder arrangement, the combination comprising removable cutting insert means having an aperture therethrough, said insert aperture being cylindrically shaped, tool holder means having a bed at one end thereof for receiving said cutting insert means, said bed terminating in an abutment surface, a threaded aperture extending from the top of said bed to the bottom of said bed, said threaded aperture positioned further from said abutment surface at the top of said bed than at the bottom of said bed, and clamp screw means fitted inside said cutting insert aperture for clamping said cutting insert means against said bed and said abutment surface when threaded into said threaded aperture and for releasing said cutting insert means without removing said clamp screw means from said threaded aperture.

2. A cutting tool holder arrangement, the combination comprising removable cutting insert means having an aperture therethrough, tool holder means having a bed at one end thereof for receiving said cutting insert means, said bed terminating in an abutment surface, a threaded aperture extending from the top of said bed to the bottom of said bed, said threaded aperture being at an angle to the normal to said top of said bed and positioned further from said abutment surface at the top of said bed than at the bottom of said bed, and clamp screw means threaded into said threaded aperture, said clamp screw means shaped to exert simultaneous forces clamping said cutting insert means against said abutment surface and said bed top when threaded into said threaded aperture so that no part of said clamping screw remain above the top of said cutting insert means.

3. A cutting tool holder arrangement, the combination comprising removable cutting insert means, tool holder means, bed means on said tool holder means for receiving said cutting insert means, said bed means terminating in an abutting surface, a threaded aperture extending from the top of said bed means to the bottom of said bed means, clamp screw means threaded into said threaded aperture, said threaded aperture being at an angle so that the distance between the top of said clamp screw means and said abutting surface decreases as the clamp screw means is threaded deeper into said threaded aperture and said cutting insert means having an aperture therethrough for receiving and completely enclosing said top of said clamp screw means whereby said cutting insert means is clamped on said tool holder means when said clamp screw means is threaded deeper into said threaded aperture.

4. A cutting tool holder arrangement, the combination comprising removable cutting insert means, tool holder means having a bed at one end thereof for receiving said cutting insert means, said bed terminating at one end thereof in at least one abutment surface, a threaded aperture extending from the top of said bed to the bottom of said bed, said threaded aperture being at an angle to the normal to said top of said bed and positioned further from the said abutment surface at the top of said bed than at the bottom of said bed, clamp screw means integrally comprising a first threaded conical section and a second cylindrical section, the said sections being at opposite ends of said clamp screw means, said threaded cylindrical section being a proper size to thread into said threaded aperture, and bore means in said cutting insert means for receiving the conical section of said clamp screw when said insert is placed on said bed whereby said insert means is forced into abutment with said abutment surfaces and said bed when said clamp screw means is threaded deeper into said threaded aperture.

5. The tool holder arrangement of claim 4 wherein the said second cylindrical section is threaded to fit into said threaded aperture.

6. A cutting tool holder arrangement, the combination comprising removable cutting insert means, tool holder means having a bed at one end thereof for receiving said cutting insert means, said bed terminating at one end thereof in at least one locating surface, a threaded aperture extending from the top of said bed to the bottom of said bed, said threaded aperture being at an angle to the normal to said top of said bed, said aperture located so that it positioned further from the plane of the locating surface at the top of said bed than from the plane of the locating surface at the bottom of said bed, clamp screw means, said clamp screw means comprising a first cylindrical section and a truncated conical section, said truncated conical section having an apex angle equal to twice the angle between said threaded aperture and said normal to the top of said bed whereby said periphery of said conical section at a point facing the locating surface is normal to the top of said bed, said cutting insert means having an aperture therethrough for receiving said conical section of said clamping screw means, the sides of said aperture being normal to the bottom of said cutting insert means whereby said conical section is substantially parallel to said sides of said aperture when said cutting insert means is placed on said bed to be clamped against the locating surfaces and said bed.

7. In the tool holder arrangement of claim 6 wherein said bed is horizontal.

8. In the tool holder arrangement of claim 7 wherein the locating surfaces are vertical.

9. In the tool holder arrangement of claim 7 wherein the said bed has a positive angle.

10. In the tool holder arrangement of claim 8 wherein the said bed has a negative angle.

11. In the tool holder arrangement of claim 1 wherein the means for actuating said clamp screw means is accessible at the bottom side of said bed through said threaded aperture.

12. A cutting tool arrangement, the combination comprising clamp screw means, removable cutting insert means having an aperture therethrough for receiving the clamp screw means, tool holder means having a bed at one end thereof for receiving said cutting insert means, said bed terminating in an abutment surface, a threaded aperture extending from the top of said bed to the bottom of said bed and describing an angle normal to said top of said bed, said clamp screw means having a threaded cylindrical section fitting said threaded aperture and a truncated conical section received in said insert aperture, said arrangement characterized in that the apex angle of said conical section is equal to twice the angle of the threaded aperture to the normal whereby when said clamp screw means is threaded into said threaded aperture the side of the conical section toward said abutment surface is perpendicular to said top of said bed and moves closer to said abutment surface clamping said insert against the bed and the abutment surface.

13. A cutting tool holder arrangement, the combination comprising cutting insert means, tool holder means having a bed thereon for removably receiving said cutting insert means, said bed terminating in an abutment surface at one end thereof, means for clamping said cutting insert means simultaneously against said bed and said abutment surface, said clamping means comprising a clamping screw, threaded aperture means in said bed for receiving said screw, and said threaded aperture having an angle, means for threading said screw into said aperture to clamp said insert means to locate on said abutment surface and said bed, and means in said cutting insert means for preventing said screw from appearing above said insert means when said insert means is clamped in place.

14. In the tool holder arrangement of claim 13 wherein said means for threading said screw clamp into said aperture is accessible from the bottom of said bed through said threaded aperture.

15. A device for holding and automatically positioning a tool element having an aperture therein, comprising holding means having shoulder means thereon and having an aperture therein disposed at an angle to the said aperture of said tool element when said element is positioned on said holding means, and adjustable means cooperative with the said apertures in the said tool element and in the said holding means for exerting a force within the confines of the said tool element aperture urging the said tool element into abutting relation with said shoulder means.

16. A device as set forth in claim 15 wherein said adjustable means is movable along the longitudinal axis of said aperture of said holding means.

17. A device as set forth in claim 15 wherein the peripheries of all cross sections of said adjustable means are concentric.

18. A device as set forth in claim 15 wherein the said aperture in said holding means is disposed at an angle with respect to the abutting portion of said shoulder means.

19. A tool holder for use with an insert which comprises a body in the form of a regular polygon having a central cylindrical hole extending there through, said tool holder comprising a shank, a portion of reduced thickness at one end of said shank, said portion of reduced thickness defining a base for receiving an insert, and a pair of side walls at the junction of said base and remainder of said insert, said side walls being inclined at an angle equal to the angle between adjacent sides of an insert, a screw-threaded bore extending into said base, a screw-threaded pin engaged in said bore and having an extension of truncated conical form extending from said bore into said cylindrical hole in said insert, the axis of said bore extending at an acute angle to the axis of said hole in said insert, said truncated-concial extension making line contact with the hole in said insert, and axial movement of said pin clamping said insert against said side walls.

20. A cutting tool comprising a body, means defining an insert-receiving pocket on said body including a bed and a pair of angularly related abutment surfaces upstanding therefrom, an opening in said bed, a cutting insert including a pair of side surfaces joined by a plurality of angularly related edge surfaces, an aperture extending entirely through said insert between said side surfaces thereof, the respective axes of said opening and aperture both substantially intersecting the bisector of the angle defined by said abutment surfaces and being in different positions relative to each other and the apex of said angle, and a fastener member extending through said aperture and into said opening and secured to said body, said fastener member drawing an adjacent pair of said edge surfaces of said insert substantially simultaneously and equally into engagement with said respective abutment surfaces.

21. A cutting tool comprising a body, means defining an insert-receiving pocket on said body including a bed and a pair of angularly related abutment surfaces upstanding therefrom, an opening extending into said body from said bed and having its axis located in a plane extending substantially perpendicularly to said bed and bisecting the angle defined by said abutment surfaces, a cutting insert including a pair of side surfaces joined by a plurality of angularly related edge surfaces, an aperture extending entirely through said insert between said side surfaces thereof, the axis of said aperture being located substantially in said plane in a position different than the position of the axis of said opening relative to the apex of said angle, and a fastener member extending through said aperture and into said opening and secured to said body, said fastener member drawing an adjacent pair of said edge surfaces of said insert substantially simultaneously and equally into engagement with said respective abutment surfaces.

22. A cutting tool comprising a body, means defining an insert-receiving pocket on said body including a bed and a pair of angularly related abutment surfaces upstanding therefrom, an opening extending into said body from said bed and having its axis located in a plane extending substantially perpendicularly to said bed and bisecting the angle defined by said abutment surfaces, a cutting insert including a pair of side surfaces joined by a plurality of angularly related edge surfaces, an aperture extending entirely through said insert between said side surfaces thereof, the axis of said aperture being disposed at an angle to the axis of said opening and being located substantially in said plane, and a fastener member extending through said aperture and into said opening and secured to said body, said fastener member drawing an adjacent pair of said edge surfaces of said insert substantially simultaneously and equally into engagement with said respective abutment surfaces.

23. The invention as defined in claim 22 wherein said aperture is of substantially uniform circular diameter throughout its length and said fastener member includes a conically tapered head portion of circular cross section disposed within said aperture and engaging said insert, the angle of taper of said tapered head portion being substantially equal to the angle between said axes so that said tapered head portion engaging said insert is substantially parallel to the axis of said aperture.

References Cited

UNITED STATES PATENTS

| | | | |
|---|---|---|---|
| 1,838,520 | 12/1931 | Archer | 29—98 |
| 1,964,786 | 7/1934 | McLean | 29—105 |
| 2,598,581 | 5/1952 | McKenna | 29—98 |
| 2,630,725 | 3/1953 | Black | 29—105 X |
| 2,999,301 | 9/1961 | Conti | 29—96 |
| 3,060,771 | 10/1962 | Johnson | 29—96 X |
| 3,173,191 | 3/1965 | Alexander | 29—96 |

FOREIGN PATENTS

| | | |
|---|---|---|
| 350,706 | 6/1931 | Great Britain. |
| 831,244 | 3/1960 | Great Britain. |
| 1,245,148 | 9/1960 | France. |

HARRISON L. HINSON, *Primary Examiner.*